(12) United States Patent
Miyazaki

(10) Patent No.: US 6,643,407 B1
(45) Date of Patent: Nov. 4, 2003

(54) METHOD OF COMPRESSING MULTI-SPECTRAL IMAGE

(75) Inventor: Keiichi Miyazaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 678 days.

(21) Appl. No.: 09/604,435

(22) Filed: Jun. 28, 2000

(30) Foreign Application Priority Data

Jun. 28, 1999 (JP) .......................................... 11-182130

(51) Int. Cl.[7] ................................................. G06K 9/36
(52) U.S. Cl. ..................................................... 382/240
(58) Field of Search ................................ 382/162, 166, 382/232, 233, 240; 348/413.1, 416.1, 845.1; 375/240.26, 240.29

(56) References Cited

U.S. PATENT DOCUMENTS 5,838,817 A * 11/1998 Funada ........................ 382/166
6,125,147 A * 9/2000 Florencio et al. ......... 375/240.29

* cited by examiner

Primary Examiner—Jose L. Couso
(74) Attorney, Agent, or Firm—Sughrue Mion, PLLC

(57) ABSTRACT

The method of compressing a multi-spectral image formed of a plurality of elemental images having different spectral distribution ranges calculates an average image and a superior average image by averaging two elemental images and two inferior average images having respective spectral distribution ranges close to each other, respectively. The method calculates finally a superlative average image of all the elemental images by hierarchically repeating the calculating step. Next, the method creates differential images between all the elemental images and the respective average images and between the inferior average images and the respective superior average and calculates compressed differential images by compressing the differential images. The method records the superlative average image and the compressed differential images so as to take a hierarchical structure with the superlative average image being positioned at a top. The method is capable of preferably compressing the multi-spectral image while making use of characteristics thereof and grasping an entire configuration of the image without a necessity for observing all elemental images.

9 Claims, 1 Drawing Sheet

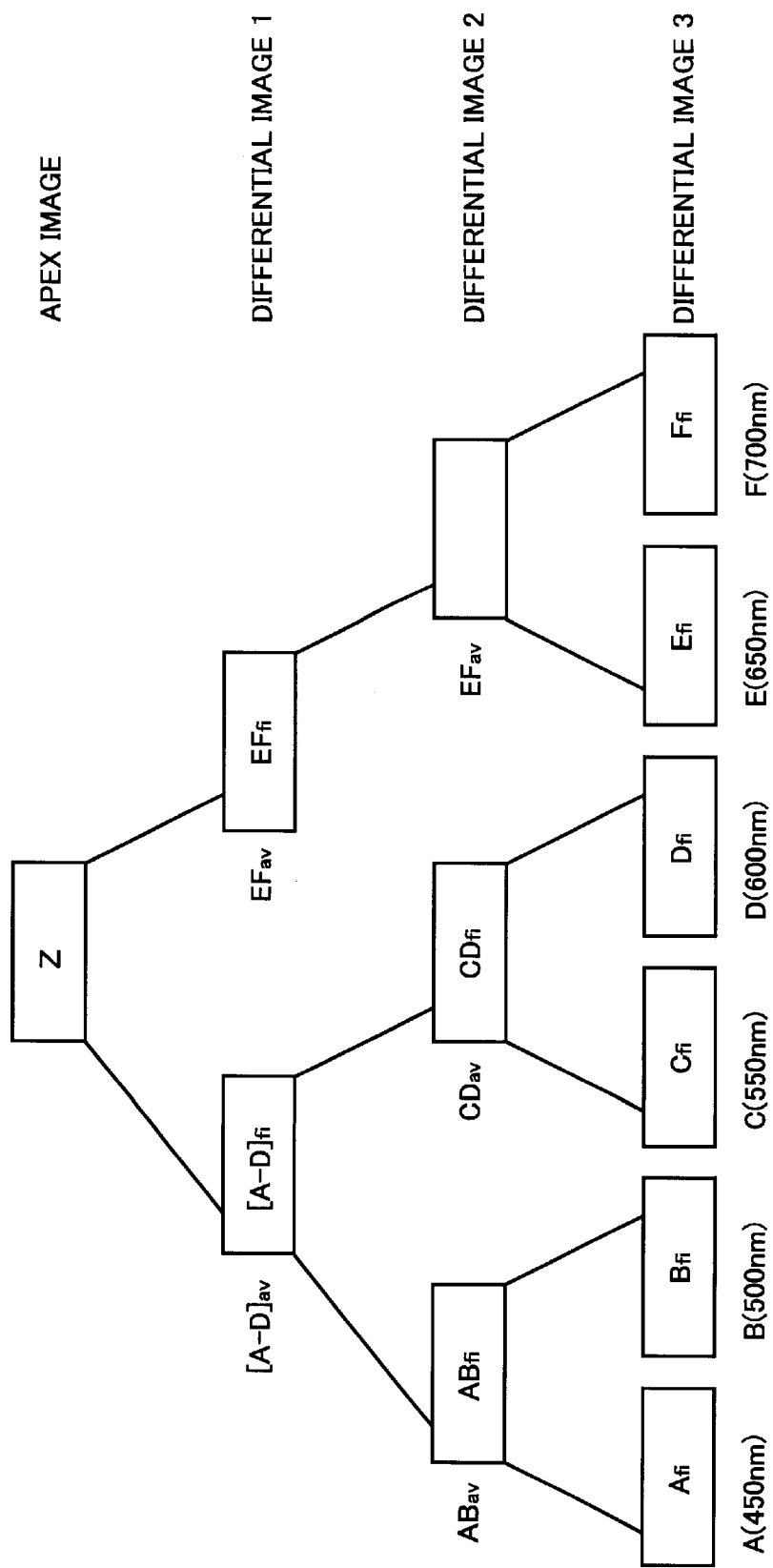

METHOD OF COMPRESSING MULTI-SPECTRAL IMAGE

BACKGROUND OF THE INVENTION

The present invention relates generally to a technology of a multi-spectral image photographed by multi-band photography and more particularly, to a method of compressing a multi-spectral image which makes full use of characteristics thereof.

A color image photographed by a digital camera and a color image photographed by a conventional camera or otherwise are reproduced and analyzed normally by use of images (image data) based on three channels of R (red), G (green) and B (blue).

A color image (a photographing scene), however, contains so many contents of information, and hence there might often arise a case of being unable to obtain sufficient contents of information from the images based on three channels of R, G and B when analyzing spectral sensitivity characteristics of the digital camera, a photosensitive material, etc. at a high accuracy, and analyzing and reproducing the images at the high accuracy.

A multi-spectral image photographed by multi-band photography is known as an image in which the above problem can be obviated.

The multi-spectral image comprises images based on multi-channels having different spectral distribution ranges. A formation of the multi-spectral image involves the use of over four types, e.g., six types of filters having spectral transmittance characteristics of which peak wavelengths are respectively 450 nm, 500 nm, 550 nm, 600 nm, 650 nm and 700 nm. Those filters are inserted in sequence, and the same object (scene) is photographed the same number of times as the number of filters, thereby making it feasible to obtain the multi-spectral image comprising the plurality of images having the spectral distribution ranges different from each other corresponding to the number of filters for use.

This method is capable of obtaining the image in which wavelength ranges of the information contained in the object are segmented corresponding to the number of filters for use and wavelength resolutions, and hence it is possible to perform analyses of a digital camera, a photosensitive material, etc., and analyses, reproduction, etc. of the images at a high precision.

The multi-spectral image, however, normally includes images based on four to sixteen channels, and therefore has by far a larger quantity of image data than the conventional images based on three channels of R, G and B. A large storage region, volume or capacity is needed for handling the data, and besides reading and writing processes of the data require a comparatively long period of time.

Further, it is required that a whole image be observed (reproduced) in order to grasp states, patterns, etc. of the images, an operation which takes much time and labor.

SUMMARY OF THE INVENTION

It is a primary object of the present invention, which was devised to obviate the problems inherent in the prior art described above, to provide a method of compressing a multi-spectral image, which is capable of preferably compressing the multi-spectral image while making use of characteristics thereof and grasping an entire configuration of the image without a necessity for observing all elemental images.

To accomplish the above object, according to one aspect of the present invention, a method of compressing a multi-spectral image formed of a plurality of elemental images having different spectral distribution ranges, comprising a step of extracting pairs of elemental images having respective spectral distribution ranges close to each other from the plurality of elemental images, a step of averaging the thus extracted pairs of elemental images to calculate average images, provided that an elemental image that does not form a pair is taken to be as such an average image, a step of further extracting pairs of inferior average images having respective spectral distribution ranges close to each other, a step of further averaging the thus extracted pairs of inferior average images to calculate superior average images, provided that an inferior average image that does not form a pair is taken to be as such a superior average image, a step of hierarchically repeating the averaging steps in which the same elemental images and inferior average images are not used to calculate the average images and the superior average images, respectively, thereby finally calculating a superlative average image of all the elemental images, a step of creating differential images obtained by taking differences between all the elemental images and the respective average images and between the inferior average images and the respective superior average, a step of calculating compressed differential images by compressing the differential images and a step of recording the superlative average image and the compressed differential images so as to take a hierarchical structure with the superlative average image being positioned at a top corresponding to a hierarchical structure constructed of all the elemental images, all the average images and the superlative average image positioned at the top.

It is preferable that the two elemental images having the respective spectral distribution ranges close to each other and for calculating the average image are two elemental images having the respective spectral distribution ranges closest to each other and wherein the two inferior average images having the respective spectral distribution ranges close to each other and for calculating the superior average image are two inferior average images having the respective spectral distribution ranges closest to each other.

It is also preferable that the differential images are obtained by taking the differences between the average image and the two elemental images used for calculating the average image, between the superior average image and the two inferior images used for calculating the superior average image and between the superlative average image and the two inferior average images used for calculating the superlative average image.

It is further preferable that the differential images are compressed by using a loss-less compression method to calculate the compressed differential images.

It is still further preferable that the differential images are compressed by using a run length method or a Huffman method to calculate the compressed differential images.

It is another preferable that, in addition to the method described above, the method further comprises a step of calculating a compressed superlative average image by compressing the superlative average image and wherein the compressed superlative average image is recorded in stead of the superlative average image.

It is further preferable that the superlative average image is compressed by using a loss-less compression method to calculate the compressed superlative average image.

It is still further preferable that the superlative average image is compressed by using a run length method or a Huffman method to calculate the compressed superlative average images.

According to the another aspect of the present invention, a method of compressing a multi-spectral image formed of a plurality of elemental images having different spectral distribution ranges, comprising a step of calculating an average image by averaging two elemental images having respective spectral distribution ranges close to each other and by taking an elemental image that does not form a pair to be as such the average image as well as differential images by taking differences between the respective two elemental images and the average image thereof, a step of further calculating a superior average image by averaging two inferior average images having respective spectral distribution ranges close to each other and by taking an inferior average image that does not form a pair to be as such the superior average image as well as differential images by taking differences between the respective two inferior average images and the superior average image thereof, a step of calculating more superior average images and a superlative average image of all the elemental images as well as differential images between respective two more inferior average images and the more superior average image thereof and between the respective two more inferior average images and the superlative average image thereof by hierarchically repeating the further calculating step, a step of calculating compressed differential images by compressing the differential images and a step of recording the superlative average image and the compressed differential images so as to take a hierarchical structure with the superlative average image being positioned at a top corresponding to a hierarchical structure constructed of all the elemental images, all the average images and the superlative average image positioned at the top.

BRIEF DESCRIPTION OF THE DRAWING

FIG. 1 is an explanatory conceptual diagram showing a method of compressing a multi-spectral image according to the present invention.

DESCRIPTION OF THE PREFERRED EMBODIMENT

A method of compressing a multi-spectral image according to the present invention will hereinafter be described in depth.

FIG. 1 conceptually illustrates the method of compressing the multi-spectral image according to the present invention (which will hereinafter be simply referred to as a compression method). The compression method in this embodiment involves the use of six types of filters exhibiting spectral transmittance characteristics in which respective peak wavelengths are 450 nm, 500 nm, 550 nm, 600 nm, 650 nm and 700 nm. These six pieces of filters are sequentially inserted one by one to obtain six original images (which will hereinafter be termed "elemental images") of which spectral distribution ranges are different from each other. This compression method is contrived to compress a multi-spectral image comprising these elemental images.

Note that the number of the elemental images configuring the multi-spectral image to be compressed by the compression method of the present invention is not limited to six and may be enough if over 4, and preferably the multi-spectral image comprises 4 through 81 elemental images, and more preferably 6 through 32 elemental images, and most preferably 6 through 10 elemental images.

Further, an interval between the spectral distribution ranges (which may be defined as ranges of a spectral reflectance of an object (scene) photographed as the respective elemental images) of the individual elemental images, i.e., an interval between adjacent two wavelength ranges of the elemental images, is not limited to the equal interval described above but may be a different interval corresponding to applications, etc. of the multi-spectral image. Note that the interval between the adjacent wavelength ranges (e.g., between two peaks of the adjacent wavelength ranges) is an interval between peaks of the filters used for photographing of the respective elemental images in the embodiments illustrated, and, if taking the multi-band photography using diffraction gratings, peaks of diffraction intensities may be likewise used.

Moreover, the elemental images may be photographed by a digital camera or photographed on a monochrome film having substantially a uniform spectral sensitivity over a visible range, and (image data) of the elemental images may be either luminance data or density data.

According to the present invention, two elemental images having the wavelength ranges close to each other are combined, and an average image is calculated by averaging these two elemental images. Further, two average images having the wavelength ranges close to each other are combined, and a superior (high-order) average image is calculated by averaging the two inferior (subordinate) average images. A superlative (highest-order) average image (which will hereinafter be referred to as an apex image Z) of all the elemental images is calculated by repeating these hierarchical calculations.

To be specific, it is assumed that an elemental image A is photographed by use of a filter having a peak wavelength of 450 nm, an image B is formed by a 500 nm-peak filter, an image C is by a 550 nm-peak filter, an image D is by a 600 nm-peak filter, an image E is by a 650 nm-peak filter, and an image F is by a 700 nm-peak filter. Based on this assumption, an average image ABav (=(A+B)/2) is calculated by taking an average of the elemental images A and B. Hereinafter, an average image CDav and an average image EFav are similarly calculated.

Note that the combination of the elemental images is not confined to the condition that those elemental images must have the wavelength ranges closest to each other, and there may be combined the elemental images of which the wavelength ranges are approximate to each other, e.g., the elemental images including an overlap of the wavelength ranges in accordance with the spectral transmittance characteristics of the filters. It is, however, desirable in terms of a compression rate and a treatment when in a reading process to combine the elemental images assimilating to each other, viz., having the wavelength ranges closest to each other. This technical point is likewise applied to averaging the average images, e.g., the inferior average images, which is subsequently executed.

Subsequently, the calculation of the superior average image obtained by combining and averaging the inferior average images having the wavelength ranges approximate to each other, is hierarchically repeated, thereby calculating the apex image (superlative average image) Z obtained by averaging all the elemental images.

In the embodiment illustrated, the average image ABav is combined with the average image CDav, thereby calculating an average image [A–D]av. The average image EFav has no average image to be combined with, and therefore carried up to a higher layer, in which the average image [A–D]av and the average image EFav are averaged, thereby calculating the apex image Z obtained by averaging the elemental images A to F.

That is, according to the present invention, the averaging process is repeated as proceeded in a tournament system, and the apex image may be thus calculated.

Accordingly, in the embodiment illustrated, the apex image Z may also be calculated by a method such as, for example, calculating the average image BCav by combining the elemental image B with the elemental image C on the lowest layer, and calculating the average image [A–C]av by combining the elemental image A with the average image BCav on the higher layer.

In parallel with this calculation of the average image, or alternatively after finishing all the. calculations of the average images, differential images are calculated by taking differences between the elemental images and the respective average images and between the average images and the average images on the higher layer.

In accordance with the embodiment illustrated, a differential image Afi (=ABav−A) is calculated by taking a difference between the elemental image A and the average image ABav on the higher layer. In the following operation, similarly a differential image Bfi, a differential image Cfi, a differential image Dfi, a differential image Efi and a differential image Ffi are calculated.

Further, on a much higher layer also, a differential image ABfi (=[A–D]av−ABav) is calculated by taking a difference between the average image ABav and the average image [A–D]av, and similarly a differential image CDfi is calculated. Note that since the averaging process is not effected with respect to the average image EFav, a differential image is not calculated, and there is given a differential image as it is with information indicating this purport.

Moreover, on a still higher layer, a differential image [A–D]fi between the apex image Z and the average image [A–D]av and a differential image EFfi between the apex image Z and the average image EFav, are calculated in the same way.

The thus calculated differential images and, preferably, the apex image Z are compressed.

The compression method is not particularly limited, and a variety of known methods are usable. In terms of considering reproducibility, analysis, etc. of the image, however, preferably a loss-less compression method. To be more specific, the run length method is used, the Huffman method, etc. may be exemplified.

Next, the apex image Z and the respective differential images, which have been compressed, are recorded on a recording medium, etc. to take the hierarchical structure configured when calculating the average images with the apex image being positioned at the top or vertex. Then, the image compression comes to an end.

That is, as shown in FIG. 1, with the apex image Z being positioned at the top, the differential image [A–D]fi and the differential image EFfi are positioned on the layer defined as a differential image 1. The differential image ABfi, the differential image CDfi and the information showing no calculation of a differential image with respect to the average image EFav are positioned on the lower layer defined as a differential image 2. Positioned on the lowest layer defined as a differential image 3 are the differential image Afi, the differential image Bfi, the differential image Cfi, the differential image Dfi, the differential image Efi and the differential image Ffi.

Based on the compression method of the present invention, the elemental images (the average images) having the wavelength ranges close, preferably, closest to each other are combined, and the differential image obtained by taking the difference between the average images is stored.

Of the multi-spectral image, the elemental images having the wavelength ranges approximate to each other normally exhibit a high similarity, and hence a information content (date volume) of the differential image therebetween is small. Besides, this small-content differential image is compressed, whereby a high compression rate can be attained. Further, the information content (date volume) of the differential image being small, a resolution (the number of bits of the data) can be made smaller than in the apex image Z and the elemental images.

In addition, according to the present invention, the apex image Z positioned at the top of the hierarchy is categorized as the average image obtained by averaging all the elemental images, and therefore an outline of the object (all the elemental images) can be grasped simply by observing this apex image Z. Namely, the entire configuration of the image can be grasped by a simple reading process of only the apex image or immediately after reading this image.

Further, the image compressed according to the present invention is decompressed by performing the previous calculations in the reversal order sequentially from the apex image down to the lowest layer, using the individual differential images. As the image decompression proceeds down to the lower layer, it becomes feasible to gradually grasp the states of the images in greater details. That is, the reading process may be finished just when necessary contents of information are obtained, and the efficiency of analyzing the image and so forth can be enhanced.

The method of compressing the multi-spectral image according to the present invention has been fully discussed so far. The present invention is not, however, limited to the embodiments discussed above and may be, as a matter of course, modified and changed in many ways without departing from the gist of the present invention in the scope of the present invention.

As explained above in detail, based on the method of compressing the multi-spectral image according to the present invention, the multi-spectral image can be compressed at the high compression rate with the contrivance of making full use of the characteristics thereof. Besides, the whole configuration of the image can be exactly grasped by reading a less quantity of data without the necessity for observing all the elemental images.

What is claimed is:

1. A method of compressing a multi-spectral image formed of a plurality of elemental images having different spectral distribution ranges, comprising:

a step of extracting pairs of elemental images having respective spectral distribution ranges close to each other from said plurality of elemental images;

a step of averaging the thus extracted pairs of elemental images to calculate average images, provided that an elemental image that does not form a pair is taken to be as such an average image;

a step of further extracting pairs of inferior average images having respective spectral distribution ranges close to each other;

a step of further averaging the thus extracted pairs of inferior average images to calculate superior average images, provided that an inferior average image that does not form a pair is taken to be as such a superior average image;

a step of hierarchically repeating said averaging steps in which the same elemental images and inferior average images are not used to calculate the average images and the superior average images, respectively, thereby finally calculating a superlative average image of all the elemental images;

a step of creating differential images obtained by taking differences between all the elemental images and the respective average images and between the inferior average images and the respective superior averages;

a step of calculating compressed differential images by compressing said differential images; and a step of recording said superlative average image and said compressed differential images so as to take a hierarchical structure with said superlative average image being positioned at a top corresponding to a hierarchical structure constructed of all the elemental images, all the average images and the superlative average image positioned at the top.

2. The method according to claim 1, wherein said two elemental images having the respective spectral distribution ranges close to each other and for calculating said average image are two elemental images having the respective spectral distribution ranges closest to each other and wherein said two inferior average images having the respective spectral distribution ranges close to each other and for calculating said superior average image are two inferior average images having the respective spectral distribution ranges closest to each other.

3. The method according to claim 1, wherein said differential images are obtained by taking the differences between said average image and said two elemental images used for calculating said average image, between said superior average image and said two inferior images used for calculating said superior average image and between said superlative average image and said two inferior average images used for calculating said superlative average image.

4. The method according to claim 1, wherein said differential images are compressed by using a loss-less compression method to calculate said compressed differential images.

5. The method according to claim 1, wherein said differential images are compressed by using a run length method or a Huffman method to calculate said compressed differential images.

6. The method according to claim 1, further comprising: a step of calculating a compressed superlative average image by compressing said superlative average image and wherein said compressed superlative average image is recorded in stead of said superlative average image.

7. The method according to claim 6, wherein said superlative average image is compressed by using a loss-less compression method to calculate said compressed superlative average image.

8. The method according to claim 1, wherein said superlative average image is compressed by using a run length method or a Huffman method to calculate said compressed superlative average images.

9. A method of compressing a multi-spectral image formed of a plurality of elemental images having different spectral distribution ranges, comprising:

a step of calculating an average image by averaging two elemental images having respective spectral distribution ranges close to each other and by taking an elemental image that does not form a pair to be as such the average image as well as differential images by taking differences between the respective two elemental images and the average image thereof;

a step of further calculating a superior average image by averaging two inferior average images having respective spectral distribution ranges close to each other and by taking an inferior average image that does not form a pair to be as such the superior average image as well as differential images by taking differences between the respective two inferior average images and the superior average image thereof;

a step of calculating more superior average images and a superlative average image of all the elemental images as well as differential images between respective two more inferior average images and the more superior average image thereof and between the respective two more inferior average images and the superlative average image thereof by hierarchically repeating said further calculating step;

a step of calculating compressed differential images by compressing said differential images; and a step of recording said superlative average image and said compressed differential images so as to take a hierarchical structure with said superlative average image being positioned at a top corresponding to a hierarchical structure constructed of all the elemental images, all the average images and the superlative average image positioned at the top.

* * * * *